United States Patent [19]

Brems

[11] Patent Number: 4,496,280
[45] Date of Patent: Jan. 29, 1985

[54] WORKPIECE TRANSFER MECHANISM

[76] Inventor: John H. Brems, 2800 S. Ocean Blvd., Apt. 16-D, Boca Raton, Fla. 33432

[21] Appl. No.: 452,327

[22] Filed: Dec. 22, 1982

[51] Int. Cl.³ .............................................. B65G 47/34
[52] U.S. Cl. ....................................... 414/749; 414/736
[58] Field of Search ............... 414/749, 750, 751, 753, 414/782, 783, 733, 736, 71, 728; 198/375, 486, 488; 74/27, 55, 89.15, 424.8 R

[56] References Cited

U.S. PATENT DOCUMENTS

| | | | |
|---|---|---|---|
| 3,651,958 | 3/1972 | Evans et al. | 414/753 X |
| 3,667,114 | 6/1972 | Smith et al. | 414/728 X |
| 3,865,253 | 2/1975 | Healy | 414/751 X |
| 4,032,018 | 6/1977 | Wallis | 414/751 X |
| 4,422,487 | 12/1983 | McCurdy | 414/751 X |

Primary Examiner—Joseph E. Valenza
Assistant Examiner—Stuart Millman
Attorney, Agent, or Firm—Barnes, Kisselle, Raisch, Choate, Whittemore & Hulbert

[57] ABSTRACT

A mechanical transfer system for lifting and transferring parts to load and unload fixtures and pallets in a path which includes vertical and horizontal motions with a rotary input and which includes a cam modifier for the output motion to obtain a modified arcuate motion curve which will have substantially straight sections at the start and finish. This enables a straight lift or lower action for parts that need to be lowered into or lifted out of pallets or fixtures which have receiving receptacles for the parts.

10 Claims, 15 Drawing Figures

U.S. Patent  Jan. 29, 1985  Sheet 1 of 5  4,496,280
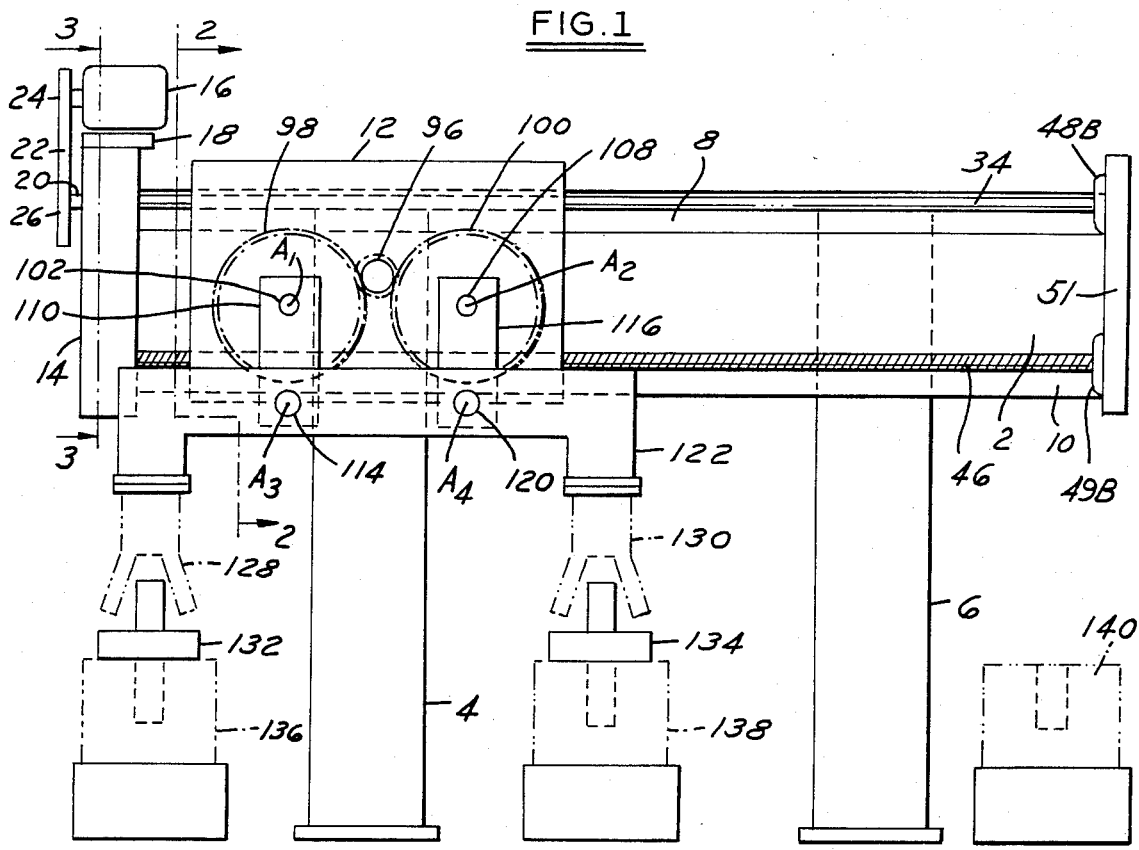
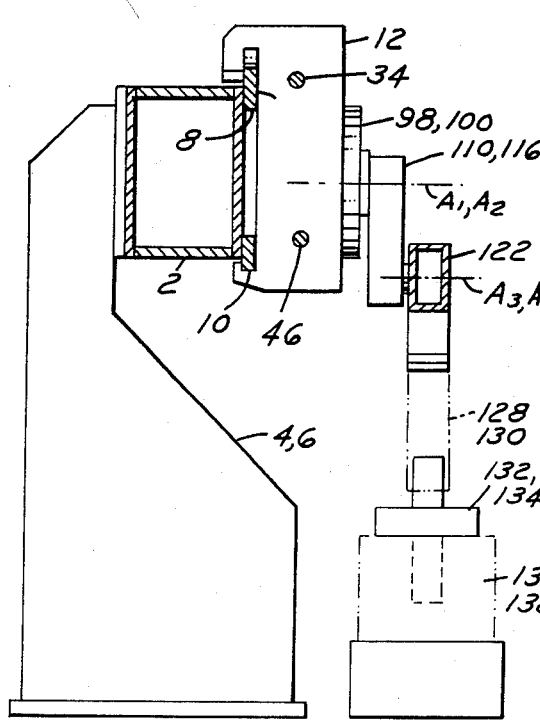
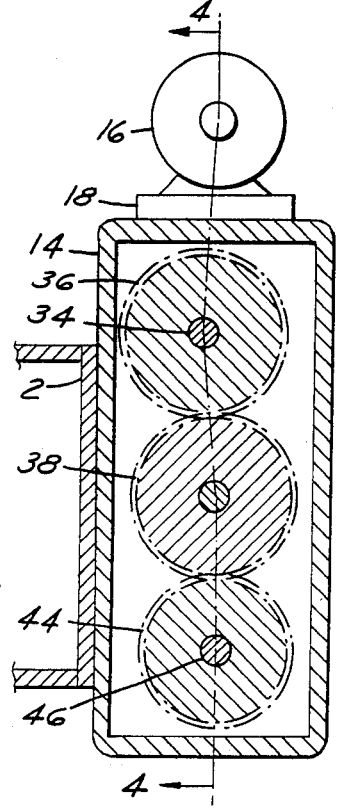
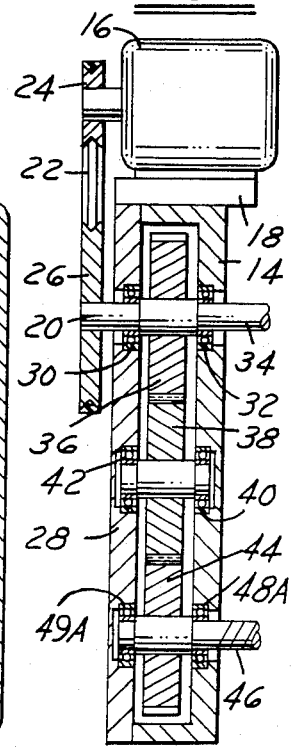

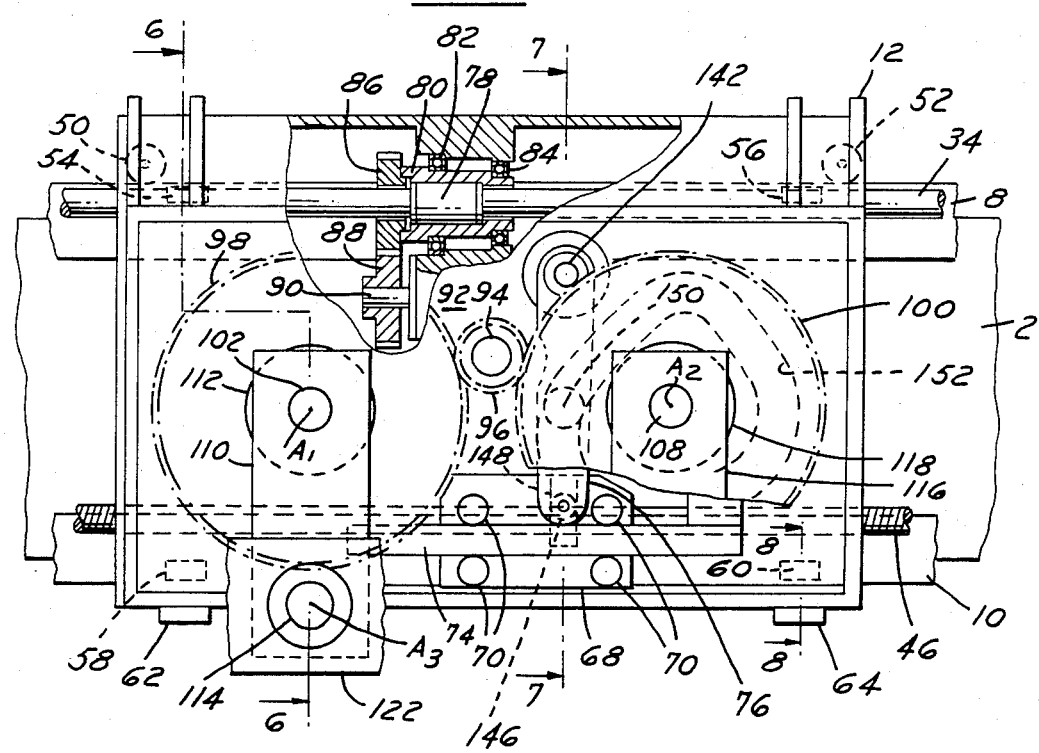

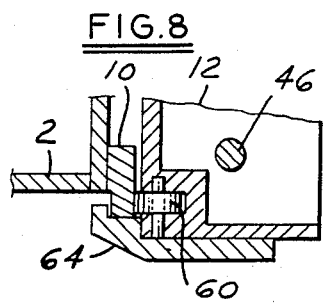
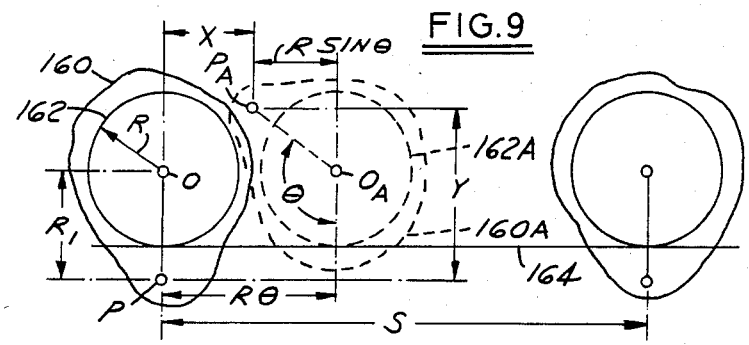
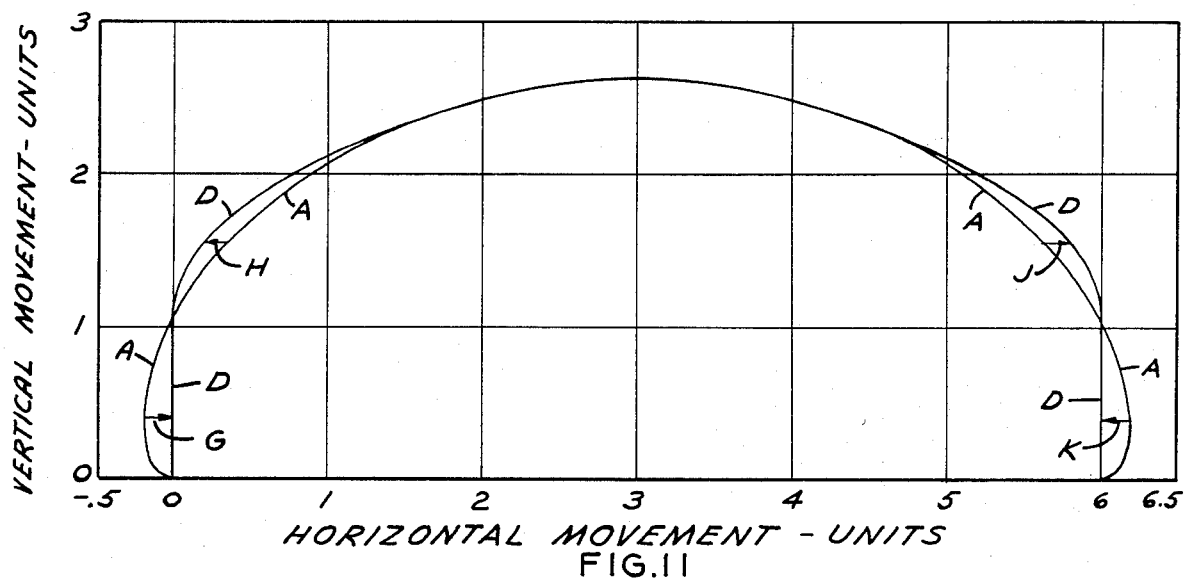
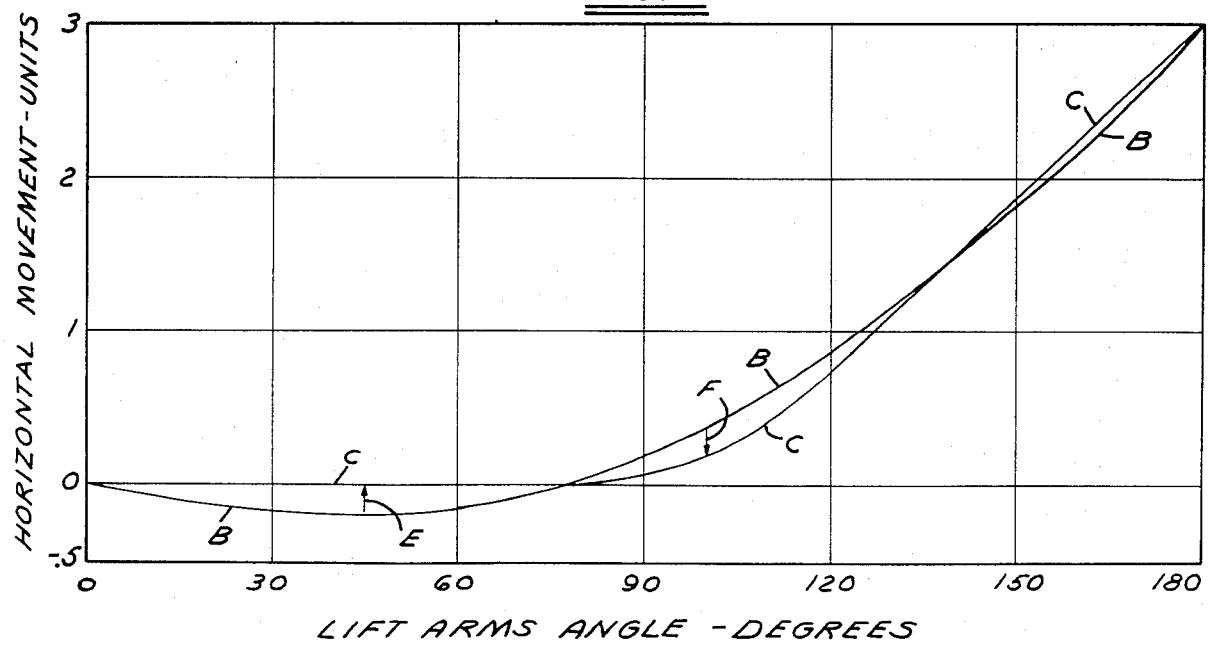

WORKPIECE TRANSFER MECHANISM

FIELD OF INVENTION

Transfer mechanisms wherein workpieces are carried from one work station to another in a path which involves a lift phase, a horizontal movement, and a lowering phase.

BACKGROUND OF INVENTION

In the general field of workpiece transfer devices, many applications arise in which it is required to transfer workpieces in a generally horizontal direction from one location to another, and in which it is further required that at the ends of the horizontal stroke, it is required to lift and then lower the workpieces through a true vertical stroke for a significant fraction of the horizontal stroke, as in loading and unloading fixtures and pallets.

It is one object of this invention to provide a fully mechanical transfer mechanism capable of lifting one or more workpieces through a true vertical stroke a first distance, then carrying said workpieces in a generally horizontal direction for a second distance, and then lowering said workpieces through a true vertical stroke equal to said first distance, where said first distance is a significant fraction of said second distance, such as approximately 15%.

Other applications arise in which it is desired to lift and lower the workpieces in a predetermined non-vertical path at the ends of a generally horizontal transfer stroke, as in by-passing an obstruction or in traversing a specified loading path into a fixture.

It is another object of this invention to provide a fully mechanical transfer mechanism which is capable of lifting a workpiece from a fixture or other comparable device in a generally vertical direction but following a predetermined non-vertical path, then transferring said workpiece in a generally horizontal direction and finally lowering said workpiece in a generally vertical direction but following a second predetermined path which need not be identical with the first such path.

These and other objects and features of the invention will be apparent in the following description and claims in which the invention is described and details are provided to enable a person skilled in the art to make and use the invention, all in connection with the best mode presently contemplated for the practice of the invention.

BRIEF DESCRIPTION OF THE DRAWINGS

Drawings accompany the disclosure and the various views thereof may be briefly described as:

FIG. 1, a front view of a workpiece transfer application utilizing this invention.

FIG. 2, a section taken on line 2—2 of FIG. 1.

FIG. 3, a section taken on line 3—3 of FIG. 1.

FIG. 4, a section taken on line 4—4 of FIG. 3.

FIG. 5, an enlarged front view and partial section of the carriage portion of this invention.

FIG. 6, a section taken on line 6—6 of FIG. 5.

FIG. 7, a section taken on line 7—7 of FIG. 5.

FIG. 8, a section taken on line 8—8 of FIG. 5.

FIG. 9, a kinematic diagram for analyzing the superposition of proportional linear and rotating motion.

FIG. 10, a scale diagram of the paths generated by this invention with and without cam modification.

FIG. 11, a graph plotting the horizontal component of the movement of the transfer beam against the lift arm angle with and without cam modification.

DETAILED DESCRIPTION OF THE INVENTION AND THE MANNER AND PROCESS OF USING IT

Figure 12:
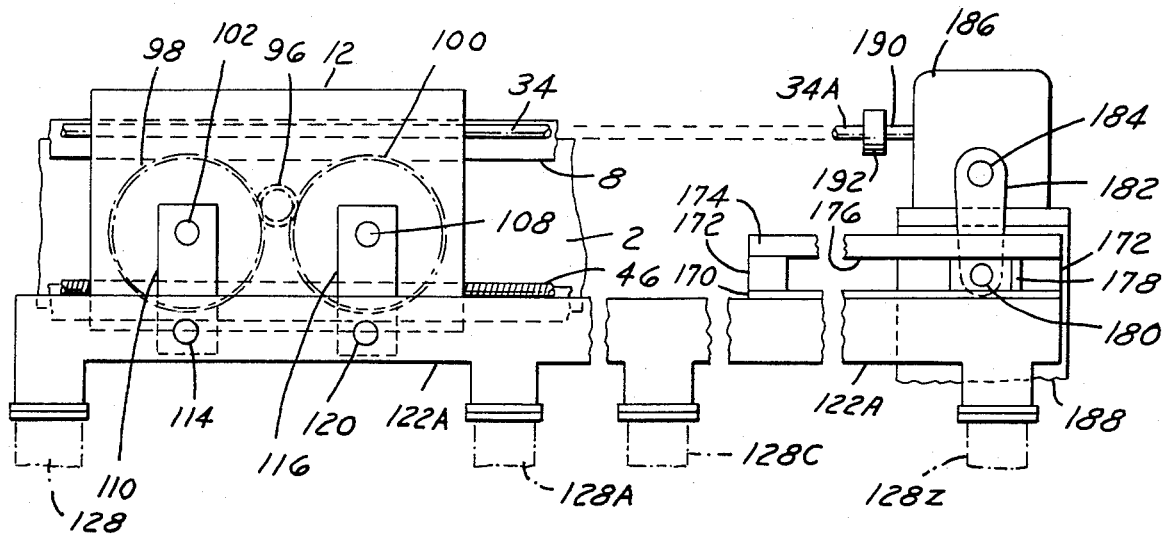
FIG. 12, a front view analogous to FIG. 1 showing means for adding an outboard support mechanism to the transfer beam.

Referring to FIGS. 1, 2, 3 and 4, a structural beam 2 is supported by two columns 4 and 6; on one vertical face of the beam 2 are mounted an upper guide rail 8 and a lower guide rail 10. These guide rails 8 and 10 support a carriage 12 for longitudinal movement along the axis of the beam 2. A transfer case 14 is mounted on one end of the beam 2 and in turn supports a drive motor 16 through an adaptor plate 18. The motor 16 drives the input shaft 20 of the transfer case through belt 22 and pulleys 24 and 26. The transfer case 14 and its associated transfer case cover 28 support the input shaft 20 through bearings 30 and 32. The shaft 20 extends through the transfer case 14, with its extension formed into a ball spline shaft 34.

A gear 36 is splined to the shaft 20-34 within the transfer case 14 and drives an idler gear 38 mounted in bearings 40 and 42. Th idler gear 38, in turn, drives a gear 44 splined to a ball lead screw shaft 46 mounted in the transfer case 14 through bearings 48A and 49A. At their other ends, the ball spline shaft 34 and ball lead screw 46 are supported by pillow blocks 48B and 49B respectively mounted on an end plate 51 mounted on the beam 2. These two shafts 34 and 46 pass through the carriage 12 and are the drive means for its interrelated movements as will be described.

Referring to FIGS. 5, 6, 7 and 8, the carriage 12 is movable on the beam 2 through two upper support rollers 50 and 52, which operate on the upper surface of guide rail 8; two lateral rollers 54 and 56, which operate on the inner surface of the guide rail 8; and two lateral rollers 58 and 60, which operate on the outer surface of guide rail 10 (FIG. 8). Due to the overhung load of the carriage 12 on the beam 2, these rollers are sufficient to position the carriage with respect to the beam. However, to prevent carriage lift or swing due to abnormal loads or forces, two keepers 62 and 64 (FIGS. 5, 6, 7) are mounted on the carriage and operate with a slight clearance with respect to rail 10.

The ball lead screw 46 passes through and is engaged by a flanged ball nut 66 mounted in a compensator block 68, this in turn being guided by eight rollers 70 which engage two guide bars 72 and 74 mounted to the structure of the carriage 12. Through these rollers 70 and guide bars 72 and 74, the compensator block can move through a short stroke with respect to the carriage 12 as controlled by a cam follower arm 76 as will be explained. The movement of the compensator block 68 with respect to the carriage 12 is in a direction parallel to the movement of the carriage on the beam 2.

The ball spline shaft 34 passes through and is engaged by a ball spline nut 78 which is keyed into a sleeve 80 that is rotatable in the carriage 12 through bearings 82 and 84. A drive gear 86 is fastened to one end of the sleeve 80 and is formed to mesh with a driven gear 88 fastened on a shaft 90; this shaft 90 is the input shaft of a worm gear reducer 92 built into the carriage frame 12 and having an output shaft 94. A drive pinion 96 is mounted on this output shaft 94 and drives two bull gears 98 and 100, having identical pitch diameters, in synchronism with each other. The bull gear 98 is mounted on a shaft 102 on axis $A_1$ rotatable in bearings 104 and 106 in the carriage 12; the bull gear 100 is mounted on a shaft 108, identical with shaft 102 and similarly rotatable in the carriage 12 on axis $A_2$.

A flanged tubular lift arm 110 is fastened to the bull gear 98 through the flange 112; at its outboard end, the lift arm 110 carries a crankshaft 114 on an axis $A_3$, substantially parallel to axis $A_1$ (FIGS. 1, 3). An identical lift arm 116 is mounted to the bull gear 100 through a flange 118, and at its outboard end carries a crankshaft 120 on an axis $A_4$ identical with crankshaft 114 (FIG. 1). Therefore, the distance from axis $A_2$ to axis $A_4$ is identical to the distance of axis $A_3$ from axis $A_1$. A transfer beam 122 is pivotally connected to the crankshaft 114 through bearings 124 and 126 on axis $A_3$; it is similarly connected to the crankshaft 120 on axis $A_4$. The distance between axes $A_3$ and $A_4$ on the transfer beam 122 is identical with the distance between axis $A_1$ and $A_2$ on the carriage 12 (FIG. 1). Mechanical hands or comparable workpiece holding devices are mounted on each end of the transfer beam 122 and are designated 128 and 130. They operate on workpieces 132 and 134 which are supported in illustrative fixtures 136 and 138; an identical third fixture 140 is capable of receiving a workpiece 132 or 134, and the spacing between fixtures 138 and 140 is identical with the spacing between fixtures 136 and 138.

The aforementioned cam follower arm 76 (FIGS. 5 and 7) is pivotally supported on a flanged shaft 142 through a bushing 144; and the flanged shaft 142 is piloted and bolted to the carriage 12. At its other end, the cam follower arm 76 supports a roller 146 which is closely fitted into a groove or slot 148 in the compensator block 68. Near its midpoint, the cam follower arm 76 supports and is driven by a cam follower roller 150 which is engaged in a cam groove 152 cut into the inner face of the bull gear 100.

The overall motion imparted to the transfer beam 122 by the aforesaid mechanism can be seen by applying the principle of superposition. If it is temporarily assumed that the ball lead screw 46 (which has a constant lead or pitch) is rotated while the ball spline shaft 34 is stationary, it can be seen that the carriage 12 will move along the beam 2 driven by the non-rotating flanged ball nut 66 and compensator block 68 moving the carriage through the cam follower arm 76 which reacts against the cam groove 150 in bull gear 100. Still assuming that only the ball lead screw 46 is rotating, the transfer beam 122 will have no relative motion with respect to the carriage 12 and both will move as controlled by the motion generated by the ball lead screw 46 and nut 66. This movement will be defined as the linear motion component.

If it is next temporarily assumed that only the ball spline shaft 34 is rotated, and it is further temporarily assumed that the cam groove 152 is a circular groove concentric about axis $A_2$, it can be seen that the ball spline shaft 34 will impart its rotary motion to the ball spline nut 78, independent of the position of the carriage 12 along the beam 2. The rotary motion of the ball spline nut is imparted to the input shaft 90 of the gear reducer 92 through the sleeve 80, gear 86 and gear 88. This in turn drives the output shaft 94 and drive pinion 96, causing both bull gears 98 and 100 and the lift arms 110 and 116, mounted thereon, to rotate in synchronism. The crankpin 114 moves in a circular path about axis $A_3$ and the crankpin 120 moves in a circular path about axis $A_4$, with each path having a radius equal to the distance between axis $A_1$ and axis $A_3$ which is equal to the distance between axis $A_2$ and axis $A_4$, and which will be defined as the distance $R_1$. The transfer beam 122 supported by the crankpins 114 and 120 also moves in a circular path, of radius $R_1$, while it remains at all times in an attitude parallel to its starting position; i.e., the transfer beam 122 is translated in a circular path of radius $R_1$. Therefore, any point on the transfer beam or of any assembly mounted on the transfer beam also moves in a circular path while maintaining a constant attitude with respect to any stationary reference frame. This applies to the mechanical hands 128 and 130 which also translate in a circular path having a radius $R_1$. This component of the total motion is defined as the circular translation component.

If it is next assumed that both the ball spline shaft 34 and the ball lead screw 46 rotate with a fixed ratio of angular velocity, as is the case with the fixed gear ratio in the transfer case 14, then the linear motion component and circular translation components are superimposed. (It is temporatily still assumed that the cam groove 152 is still a circular groove concentric about axis $A_2$ and contributes no movement component to the overall path of the transfer beam 122 or the mechanical hands 128 and 130 mounted thereon.)

The interrelationship between the gear trains generating the linear motion component and the circular translation component is such that the carriage 12 (FIG. 1) moves to the right while the bull gears 98 and 100, and the lift arms 110 and 116 rotate clockwise about axes $A_1$ and $A_2$ respectively. The distance moved by the carriage 12 during the interval in which the lift arms 110 and 116 make one revolution, from one "bottom dead center" position (as shown in FIG. 1) to the next, is defined as the "stroke" of the system. In the scale of FIG. 1, the stroke of the system is made equal to the distance between fixtures 136 and 138, which is also equal to the distance between fixtures 138 and 140. It can be seen that this interfixture distance is also equal to the distance between the hands 128 and 130 on the transfer beam 122. This distance or stroke is defined as "S".

In this theoretical superposition of the linear motion component and circular translation component, the ratio of the distance $R_1$ to the distance or stroke S is important. Any motion which is the superposition of two components, one of which is a straight line motion, and the other of which is a rotating motion, always proportional to the linear motion, may be represented as the motion of a point on a body rotating in space at a rate proportional to its linear motion in space. This, in turn, may be represented as the motion of a point, P, on a body having a portion which is a circle rolling without slippage on a straight line, as is shown in FIG. 9. A body 160 has a circular portion 162 rolling on a straight line 164. If that body makes one revolution while moving forward through a stroke, S, as do lift arms 110 and 116, it can be seen that the radius, R, of the circular portion 162 must be $$R = S/2\pi \qquad (1)$$

R is, in effect, the factor of proportionality between the linear motion component and the angular motion of the circular translation component.

The motion of the crankshafts 114 and 120 is then represented by the motion of point P on the rotating body 160 having a radius R, from the center of rotation O, which is the center of the circular portion 162, and on a line extending downward from the center O through the point of tangency with the straight line 164, at each end of the stroke. After this representative rotating body 160 has been moved from the starting position at the beginning of the stroke, through some arbitrary angle $\theta$, in radians, the position shown in FIG. 9, in dotted lines, is reached, and as denoted by the suffix letter A. The point P, representing crankshafts 114 or 120, moves to $P_A$. The horizontal component of this movement, defined as X, and which is parallel to the axis of the structural beam 2, is seen to be $$X = R\theta - R_1 \sin \theta \quad (2)$$

Similarly, the vertically upward component of the movement of point P to $P_A$, which is defined as Y, is seen to be $$Y = R_1 - R_1 \cos \theta$$

$$Y = R_1(1 - \cos \theta) \quad (3)$$

Equations (2) and (3) are parametric equations with respect to the variable $\theta$ which describe the path of point P during a stroke of length S, where $\theta$ is the angle of rotation of either lift arm 110 or 116, as measured in radians. They also describe the motion of the crankpins 114 and 120 as previously noted.

In the scale of FIG. 1, the distance $R_1$ (from axis $A_1$ to axis $A_3$ or axis $A_2$ to $A_4$) is approximately equal to 0.22 times the stroke, S. Then $$S = R_1/0.22$$

If this is substituted into equation (1), $$R = R_1/0.22 \times 2\pi)$$

$$R_1 = 1.38R \quad (4)$$

Equation (4) may be substituted into equations (2) and (3) resulting in:

$$X = R\theta - 1.38R \sin \theta \quad (5)$$

$$Y = 1.38R(1 - \cos \theta) \quad (6)$$

The path determined by equations (5) and (6), representing the path of crankshafts 114 and 120, is shown in Curve A, FIG. 10. This path is drawn for an arbitrary value of $R_1 = 0.955$, which makes the total horizontal movement (stroke) equal to 6 units. Curve A, FIG. 10, is therefore a scale representation, in arbitrary units, of the path of any point on the transfer beam 122, based on the superposition of the linear motion component and the circular translation component, but without the yet to be described contribution to the overall motion from the cam groove 152.

Whereas, in Curve A, FIG. 10, X and Y are plotted against each other through parametric equations (5) and (6); in Curve B, FIG. 11, equation (5) is directly plotted, with the horizontal movement, X, expressed as a direct function of $\theta$, the lift arm angle, converted to degrees.

It is one function of the cam groove 152 to modify the path of the transfer beam 122 such that a significant portion of the lift stroke of the system is a true vertical straight line, as related to the horizontal attitude of the structural beam 2. When expressed through the dimensions of FIG. 11, it is clear that the desired value of the horizontal component of motion, defined as X', be zero for some significant fraction of the angle of rotation on either side of the end positions. A purely arbitrary "target" displacement is therefore hypothesized for the value of X' as a function of the lift arm angle, $\theta$. Such an illustrative target function is shown by Curve C of FIG. 11. This function is briefly described as follows:

1. The value of X' is 0 for lift arm angles of 0° to 71°.
2. From a lift arm angle of 71° to 130°, the horizontal motion of the transfer beam, X', is smoothly accelerated to a calculable constant velocity.
3. From a lift arm angle of 131° to 229°, the transfer beam moves at constant velocity.
4. From a lift arm angle of 229° to 289°, the transfer beam decelerates smoothly to a stop.
5. From 289° to 360°, the transfer beam is again stationary.

It should be emphasized that these "target" objectives apply only to the horizontal component of motion of the transfer beam, X', as shown in FIG. 11.

In essence, the actual horizontal motion of the transfer beam, X, as a function of the lift arm angle $\theta$, and without any cam modification, is given by equation (5) and represented by Curve B of FIG. 11; and the desired or "target" relationship of the horizontal motion of the transfer beam, X', is given by the target function described above and represented by Curve C of FIG. 11. It follows, therefore, that the horizontal motion component required of the cam and follower system is that required to modify the motion shown by Curve B to that of Curve C. This modification is shown at two arbitrarily chosen points by arrows E and F of FIG. 11.

How this is accomplished in this invention will now be described. Referring again to FIGS. 5 and 7, it can be seen that as the bull gear 100 is rotated clockwise as driven by the pinion 9, the cam groove 152 operating on the cam follower roller 150 imparts a motion to the cam follower arm 76 which is pivoted to the carriage 12 through shaft 142 as previously noted. The roller 146 on the outboard end of the cam follower arm 76 operating in the slot 148 of the compensator block 68 therefore causes that block to move relative to the carriage 12 according to the contour of the cam groove 152 and the lever ratio between rollers 150 and 146. This movement will be defined as the cam component.

This movement of the compensator block 68 relative to the carriage 12 operates in the horizontal direction only and is permitted by the rollers 70 in engagement with the guide bars 72 and 74. While the cam groove 152 creates the movement of the compensator block relative to the carriage, it is the movement of the carriage relative to the compensator block which is the significant consideration.

It will be recalled that it is the compensator block which carries the ball lead screw nut 66 driven by the ball lead screw 46. Therefore, the cam component created by the cam groove 152 of the carriage relative to the compensator block has the effect of superimposing the cam component on the carriage movement and through it to the horizontal movement of the transfer beam previously described by equation (5). The cam groove 152 illustrated in FIG. 5 is designed to provide a cam component equal to that required to transform the horizontal motion of the transfer beam from that shown by Curve B of FIG. 11 to that of Curve C of FIG. 11.

The vertical motion of the transfer beam, as given by equation (6), is not modified by this cam component. When the "target" function of the horizontal component of the transfer beam, as shown by Curve C of FIG. 11, and now achieved through the addition of the cam component, is again combined with equation (6), with the lift arm angle $\theta$ as a parameter, the scale representation of the cam modified path of the transfer beam is shown by Curve D of FIG. 10. Arrows G, H, J and K illustrate the effect produced by the cam groove, at four arbitrarily chosen points, in transforming the path of the transfer beam from that shown by Curve A to that shown by Curve D, FIG. 10.

It can be seen that the true vertical motion of the transfer beam, as shown by the scale path representation of Curve D, represents approximately one-sixth (1/6) of the total transfer distance, and approximately 35% of the total lift height. Furthermore, this is accomplished with a cam modification of the path which is less than $\pm 3.5\%$ of the total horizontal stroke. In effect, a relatively small movement contribution from the cam system exerts a large beneficial influence on the path of the transfer beam.

Referring again to FIG. 1, the operation of the transfer beam in this illustrative application may be visualized. In the position shown, mechanical hands 128 and 130 operate to clamp workpieces 132 and 134 respectively, and fixtures 136 and 138 operate to release the workpieces, if necessary. The motor 16 is energized to drive the carriage 12 and transfer beam 122 through their stroke. The path of the transfer beam is such that the mechanical hands lift the workpieces vertically upward out of the fixtures, then move them to the right a distance equal to the spacing between the fixtures, and finally lower them vertically downward into the fixtures again; however, workpiece 132 is lowered into fixtures 138 and workpiece 134 is lowered into fixture 140. The workpieces are therefore advanced one module or one station. In a normal situation, the mechanical hands then open and the carriage and transfer beam return to their starting position, retracing their forward going path in the opposite direction. It is clear that in many applications, the movement of the transfer beam and hands in a true vertical straight line at the ends of the stroke is a valuable characteristic; in many fixtures, the loading and unloading of a workpiece in a true vertical direction is a necessity.

In the application shown in FIG. 1, fixtures 136, 138 and 140 may be identical fixtures on a given machine, or fixture 136 may represent one station of a first machine, while fixture 140 is one station of an adjacent machine, while fixture 138 is an idle station between machines, and the mechanism is used to transfer workpieces from one machine to another. In short, the mechanism is useful in transferring workpieces in any situation where a long vertical lifting and lowering movement at each end of the transfer stroke is desired.

Two mechanical hands are shown mounted on the transfer beam in FIG. 1; this too may vary with applications. Where it is necessary to transfer workpieces between two stations, only one mechanical hand is required. Where larger number of stations are utilized, the transfer beam may be lengthened and additional mechanical hands mounted thereon.

If the number of stations and mechanical hands becomes too large to be supported by a transfer beam supported only by the crankshafts 114 and 120, which is a practical consideration involving station spacing and workpiece weight, a technique for supporting a greatly lengthened transfer beam is shown in FIG. 12. A lengthened transfer beam 122A is supported by the crankpins 114 and 120 as previously described. This lengthened transfer beam supports multiple mechanical hands 128A, 128B, 128C . . . 128Z. Near its outboard end, a first guide rail 170, spacers 172, and a second guide rail 174 are fastened to the lengthened transfer beam 122A, forming a slot 176. A slider block 178 is closely fitted into the slot 176, and a crankpin 180 is rotatably connected to the slider block 178. This crankpin is mounted on the outboard end of a crank arm 182 mounted on and driven by the output shaft 184 of a gear reducer 186. The gear reducer is supported from a stationary riser 188 mounted to the floor or machine base, not shown. The input shaft 190 of the gear reducer 186 is connected through a coupling 192 to an extension 34A of the ball spline shaft 34. Three requirements must be met: first, the slot 176 must be slightly longer than the horizontal stroke of the transfer beam 122A; second, the reduction in the gear reducer 186 must be such that the output shaft 184 makes one revolution in the same interval that the lift arms 110 and 116 on carriage 12 make revolution, i.e., the overall gear ratio from the ball spline shaft to the bull gears 98 and 100 must be the same as the gear ratio from the ball spline shaft to the output shaft 184; and, third, the center distance from the crankpin 180 to the output shaft 184 on the crank arm 182 must be the same as the center distance between axis $A_1$ and $A_3$.

When these requirements are met, it can be seen that the crankpin will lift the outboard end of the transfer beam in exact synchronsim with the lift supplied by the rotation of the lift arms 110 and 116. The crankpin 180 has no influence on the horizontal position of the transfer beam due to the sliding connection between the slider block 178 and the slot 176; the horizontal motion of the transfer beam is controlled solely by crankshafts 114 and 120 as previously described. Each of the multiple mechanical hands on the transfer beam still follows the path represented by Curve D of FIG. 9, but since the lengthened transfer beam 122A now has an additional outboard support, it can be longer and support more hands than would otherwise be practical.

Figure 13:
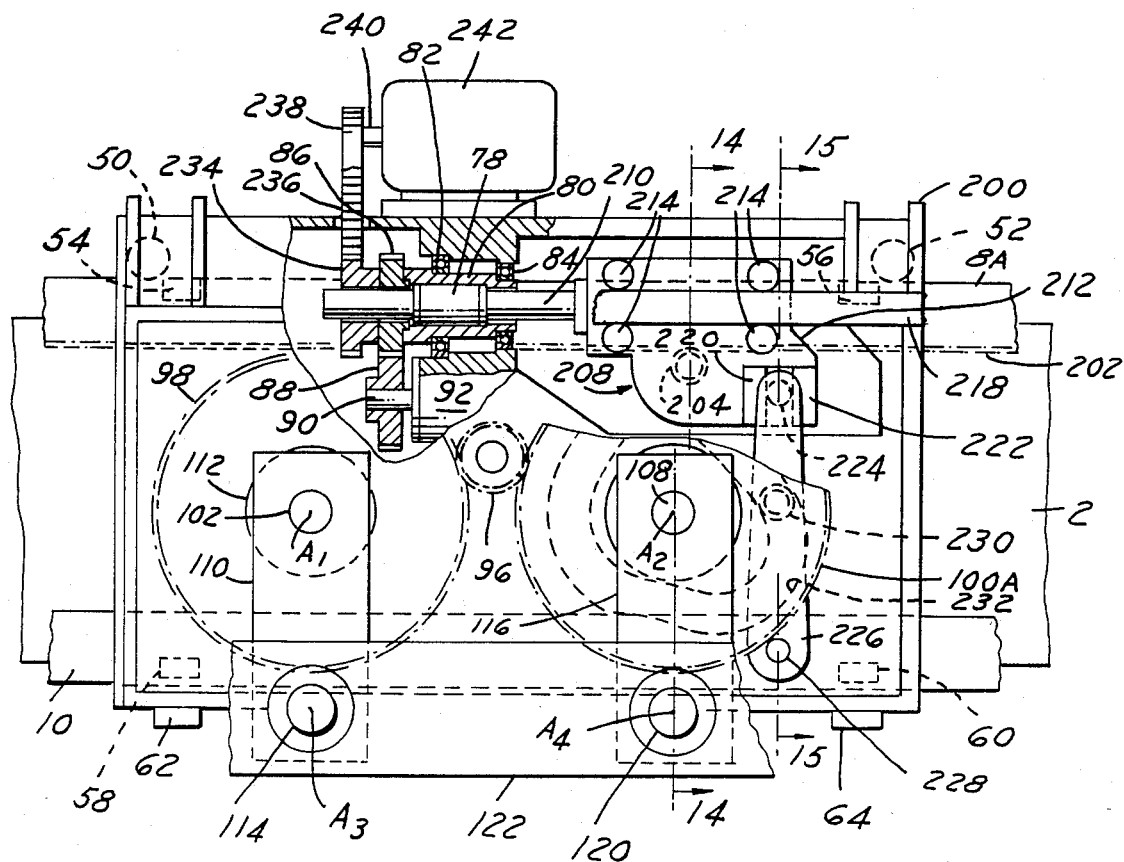
FIG. 13, a front view analogous to FIG. 5 showing an alternate construction and drive means for this invention.
Figure 14:
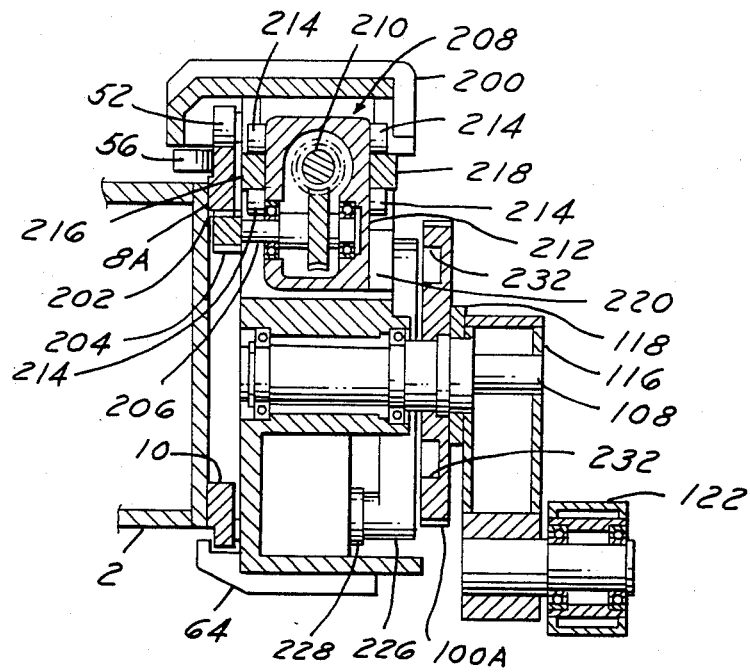
FIG. 14, a section taken on line 14—14 of FIG. 13.
Figure 15:
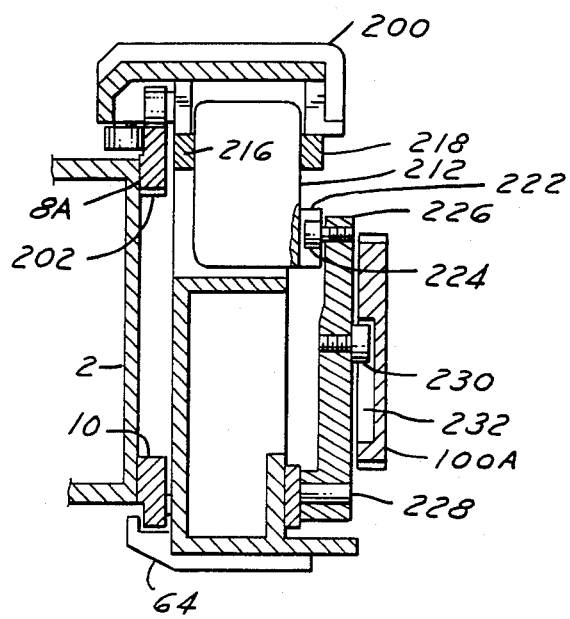
FIG. 15, a section taken on line 15—15 of FIG. 13.

An alternate embodiment employing the same principles but utilizing a different driving technique is shown in FIGS. 13–15. Referring to these figures, a revised carriage 200 is again horizontally movable on a support beam 2 through rollers 50, 52, 54, 56, 58 and 60 as previously described. The drive system is now self contained on the carriage; accordingly, the motor, transfer case, ball spline shaft and ball lead screw of the previous embodiment are deleted.

The upper guide rail 8A, attached to the structural beam 2, has a gear rack section 202 formed into its lower edge; a drive pinion 24, formed to mesh with the gear rack 202, is mounted on the output shaft 206 (FIG. 14) of a worm gear reducer 208 which also comprises an input shaft 210 and gear case 212. The gear case 212 is of custom design and is mounted through eight rollers 214 to be movable on guide rails 216 and 218 mounted on the revised carriage 200. Two drive blocks 220 and 222 are also mounted to the gear case 212, and into the space therebetween a closely fitted roller 224 operates to control the horizontal position of the gear case 212 with respect to the revised carriage 200. The roller 224 is mounted at the outboard end of a cam follower arm 226 pivotally connected to the carriage through a flanged shaft 228. Near its midpoint, the cam follower arm 226 supports and is driven by a cam follower roller 230 which engages and is operated by a cam groove 232 in the bull gear 200A; this bull gear 100A differs from its analog bull gear 100, in the original embodiment, only in the shape of the cam groove 232.

The external portion of the input shaft 210 of the gear reducer 208 is formed into a ball spline which engages the ball spline nut 78 keyed into the sleeve 80 rotatable in bearings 82 and 84 mounted in the carriage 200. A gear 86 is mounted to the sleeve 80 as in the first embodiment and in turn again drives the gear 88 mounted to the input shaft 90 of the gear reducer 92. However, in the embodiment of FIGS. 13–15, a driven pulley 234 is mounted to the face of gear 86; and this pulley 234 is driven through belt 236 from a pulley 238 mounted on the output shaft 240 of the drive motor 242.

Whereas, in the first embodiment, the gear 86 was driven through the sleeve 80 and ball nut 78 from the driving ball spline shaft 34, in the embodiment of FIGS. 13–15, the gear 86 is driven by the pulley 234 as driven by the motor 242 through pulley 238 and belt 236. The gear 86 drives the gear 88 and thence through gear reducer 92 to pinion 96 and bull gears 98 and 100A, substantially as before, to cause rotation of the lift arms 110 and 116.

The gear 86 also drives the sleeve 80 and the ball spline nut 78 which in turn drives the ball spline shaft 210 which is also the input shaft of the movable gear reducer 208. The output shaft 206 (FIG. 14) of that gear reducer and the pinion 204 operating against the stationary gear rack 202 move the carriage 200 along the structural beam 2.

If it is again temporarily assumed that the cam groove 232 is a true circle concentric about axis $A_2$, it can be seen that the carriage 200 is driven at a given rate along the beam 2 through the power train terminating in the pinion 204, while the transfer beam 122 is translated in a circular path relative to the carriage 200 through the power train terminating in crankshafts 114 and 120, at an angular rate always proportional to the given rate of carriage linear movement. This is exactly the same condition achieved by the first embodiments under the same assumption of zero contribution from the cam system. Hence, the path of the transfer beam 122 is the same for either embodiment without cam contribution. The previous definition that the stroke is the distance moved by the carriage while the lift arms 110 and 116 rotate through 360° from and to the position shown in FIG. 13 is also still valid; the kinematic diagram of FIG. 9 also still applies.

The modification desired and achieved through cam modification of the linear motion of the carriage also still applies and is achieved as follows: With the desired cam modification contour milled into the cam groove 232, as the bull gear 100A rotates, the cam groove 232 operating through cam follower roller 230 drives the cam follower arm 230 about the flanged shaft 288. The roller 224, mounted on the outboard end of the cam follower arm 226 and engaged between the drive blocks 220 and 222 on gear case 212, drives the gear case 212 with a motion determined by the contour of the cam groove 232 and the leverage ratio of the cam follower arm 226. The movement of the gear case 212 relative to the carriage is guided by the rollers 214 operating on guide bars 214 and 216 in a direction parallel to the direction of motion of the carriage on the structural beam. This movement of the gear case 212 is permitted by the sliding connection between the ball spline shaft 210 and the ball spline nut 78 while a driving relationship is still maintained therebetween.

The movement of the gear reducer 208 with respect to the carriage 200 as generated by the cam system again causes a superposition of movements for the carriage which is the sum of the movement of the gear reducer, as driven by the pinion 204 on gear rack 202, and that relative motion of the carriage with respect to the gear reducer generated by the cam, which is analogous to the first embodiment cam component.

The illustrative cam groove 232 as shown in FIG. 13 is scaled to provide the same type of cam modification to the linear travel of the transfer beam shown through Curve C of FIG. 11, and the same type of modification to the path of the transfer beam as is shown through Curve D of FIG. 10.

It is clear that the embodiment of FIGS. 13–15 shares the same mechanical interrelationships as those incorporated into the embodiment of FIGS. 1–8 which may be briefly summarized as follows: The mechanism is comprised of a first member (the carriage) which is movable in a linear direction on a frame structure, a second member (the compensator block 68 or gear reducer 208) which is mounted on the first member and is movable on the first member in a direction parallel to the direction of movability of the first member on the frame structure, a third member (the transfer beam) which is movable in a circular path of translation relative to the first member and a mechanical interrelated drive system which moves the second member along the frame structure at a rate proportional to the rate of driving the third member along the circular path of translation relative to the first member, and a cam generated movement of the first member relative to the second member.

While the specific cam contours illustrated by cam grooves 152 and 232 were designed to achieve the path for the transfer beam shown by Curve D of FIG. 10, it can be seen that other cam contours to achieve other objectives may be employed. The specific situation in which a significant portion of the travel path at each end of the stroke is vertical as related to a generally horizontal stroke is particularly useful in many workpiece transfer applications.

Other applications arise in which a straight path slightly inclined to the generally horizontal direction is also useful in some load-unload situations. Still other applications arise in which a specific non-straight end path is most advantageous. Furthermore, with appropriate cam design, the paths at each end of the stroke need not be identical, and in reversing applications, the cam groove 152 or 232 need not even close on itself. In short, with the mechanism described herein, a wide variety of paths for the transfer beam can be created by knowledgeable cam design. The general technique involves graphically portraying the desired path on a diagram such as FIG. 10, then "transforming" that path into the equivalent horizontal position versus angle representation as shown by FIG. 11, and finally finding the difference in horizontal position, for each cam angle, between the desired "transformed" path and the "unmodified" transformed path illustrated by Curve B of FIG. 11. In this connection, it should be emphasized that Curve B of FIG. 11 shows the unmodified path for a specific value of $R_1=1.38R$ (Equation 4). Other values of $R_1$ relative to R may be useful in minimizing the average difference between the unmodified transformed path and the desired transformed path. In any case, it is these differences as shown by the arrows of FIG. 11, which generate the cam profile. While the cam design techniques can best be described graphically through the curves of FIGS. 10 and 11, it is understood that the calculations should be made analytically which is readily accomplished with modern programmable calculators or even computers.

In the foregoing descriptions, the terms horizontal and vertical are used in a relative sense only. It is clear that the entire system and the path it creates can be rotated or tilted with respect to any three reference axes in space as required.

I claim:

1. In a transfer system in which one or more workpieces are sequentially moved along a line of fixtures, pallets or other workpiece holding devices, with each move along a continuous predetermined path, comprising a first relatively short motion in a first direction such as lifting, a second relatively long motion generally at right angles to the first motion such as a horizontal transfer, and a third motion generally parallel to and in the opposite direction to the first motion such as lowering, a mechanically interrelated system comprising:
 (a) a structural frame,
 (b) carriage means mounted on said structural frame for movement along a substantially linear first path,
 (c) linear drive means mounted to said carriage means for movement in a substantially linear path parallel to said first path,
 (d) transfer means mounted on said carriage means for movement in a circular path of translation with respect to said carriage means,
 (e) cam means interconnecting said linear drive means and said carriage means, and
 (f) interrelated drive means for driving said linear drive means along said structural frame at a first rate, and simultaneously driving said transfer means in a circular path of translation with respect to said carriage means at a rate proportional to said first rate, and simultaneously driving said cam means, whereby said transfer means move in a general path characterized as the superposition of a linear motion on a proportional circular motion, and whereby said transfer means move in a specific predetermined path created by the additional superposition on said general path of a modifying motion generated by said cam means between said carriage means and said linear drive means.

2. A mechanically interrelated transfer system as in claim 1 in which said modifying motion generated by said cam means between said carriage means and said linear drive means creates a specific path in which the ends of said path are displaced parallel straight line segments.

3. A mechanically interrelated transfer system as in claim 1 in which said transfer means is comprised of a transfer beam member pivotally supported on two parallel rotatable crank arm members on said carriage means driven at equal angular velocity and direction by said interrelated drive means.

4. A mechanically interrelated transfer system as in claim 3 in which said crank arm members are each attached to and driven by bull gear members.

5. A mechanically interrelated transfer system as in claim 4 in which a cam member, comprising a driving portion of said cam means, is formed in one of said bull gear members.

6. A mechanically interrelated transfer system as in claim 1 in which said cam means comprises:
 (a) a cam member rotatably mounted on said carriage,
 (b) a cam follower member pivoted on said carriage means and operatively driven by said cam member and in turn driving said linear drive means with respect to said carriage means.

7. A mechanically interrelated transfer system as in claim 1 in which said interrelated drive means comprises:
 (a) a drive motor mounted in said structural frame driving,
 (b) a power transfer means mounted on said structural frame, driving:
  (1) a spline shaft drive member operatively engaged with a spline shaft nut member rotatably mounted on said carriage means, and
  (2) a lead screw drive member operatively engaged with a lead screw nut member mounted on said linear drive means, whereby said spline shaft nut member drives said transfer means in a circular path of translation with respect to said carriage means and simultaneously drives said cam means, and whereby said lead screw nut member drives said linear drive means along said first path.

8. A mechanically interrelated transfer system as in claim 1 in which said interrelated drive means comprises:
 (a) a drive motor mounted on said carriage means driving:
  (1) a spline nut member operatively engaged with a spline shaft member driving first gear reducer means, mounted on said linear drive means, whose output member drives a pinion member engaged with a rack member mounted on said structural frame, and
  (2) second gear reducer means mounted on said carriage means for driving said transfer means in said circular path of translation, and simultaneously driving said cam means.

9. A mechanically interrelated transfer system as in claim 1 in which said transfer means are extended beyond said carriage means and additionally supported in a direction transverse to said first path by auxiliary support means driven by said interrelated drive means.

10. A mechanically interrelated transfer system as in claim 9 in which said auxiliary support means comprises gear reducer means driving crank arm means supporting said transfer means.

* * * * *